(12) United States Patent
Bebo (10) Patent No.: US 9,801,493 B2
(45) Date of Patent: Oct. 31, 2017

(54) BEVERAGE BREWING DEVICE

(71) Applicant: Joel Bebo, Denver, CO (US)

(72) Inventor: Joel Bebo, Denver, CO (US)

( * ) Notice: Subject to any disclaimer, the term of this patent is extended or adjusted under 35 U.S.C. 154(b) by 0 days.

(21) Appl. No.: 14/474,651

(22) Filed: Sep. 2, 2014

(65) Prior Publication Data

US 2016/0073818 A1 Mar. 17, 2016
US 2017/0202391 A9 Jul. 20, 2017

Related U.S. Application Data

(60) Provisional application No. 61/960,187, filed on Sep. 10, 2013.

(51) Int. Cl.
*A47J 31/00* (2006.01)
*A47J 31/20* (2006.01)
*A47J 31/18* (2006.01)

(52) U.S. Cl.
CPC ............ *A47J 31/20* (2013.01); *A47J 31/18* (2013.01)

(58) Field of Classification Search
CPC ................................. A47J 31/18; A47J 31/20
USPC .................... 99/279, 322, 323; D7/399–401
See application file for complete search history.

(56) References Cited

U.S. PATENT DOCUMENTS

| 240,402 | A |   | 4/1881 | Gee |   |
|---|---|---|---|---|---|
| 1,652,935 | A | * | 12/1927 | Goldfield | A47G 19/16 |
|   |   |   |   |   | 99/317 |
| 2,591,605 | A | * | 4/1952 | Reed | H02J 3/16 |
|   |   |   |   |   | 323/209 |
| 3,657,994 | A | * | 4/1972 | Post | A47J 31/18 |
|   |   |   |   |   | 426/82 |
| 5,855,160 | A | * | 1/1999 | Shen | A47G 19/14 |
|   |   |   |   |   | 99/279 |
| 6,007,853 | A |   | 12/1999 | Lesser |   |
| 6,374,726 | B1 | * | 4/2002 | Melton | A47G 19/16 |
|   |   |   |   |   | 220/712 |
| 7,464,637 | B1 | * | 12/2008 | Lin | A47J 31/0636 |
|   |   |   |   |   | 99/317 |
| 8,225,711 | B1 | * | 7/2012 | Andre | A47J 31/02 |
|   |   |   |   |   | 99/295 |
| 9,060,629 | B2 |   | 6/2015 | Bougdanos |   |
| 9,332,873 | B2 |   | 5/2016 | Tien |   |

(Continued)

FOREIGN PATENT DOCUMENTS

WO WO 2013162438 10/2013

OTHER PUBLICATIONS

Mr Tea Strainer & Infuser, by Fred, Aug. 15, 2014, Youtube.*

(Continued)

*Primary Examiner* — Reginald L Alexander
(74) *Attorney, Agent, or Firm* — Trenner Law Firm, LLC; Mark D. Trenner (57) ABSTRACT

A beverage brewing device and method of operation is disclosed. An example beverage brewing device includes a perforated chamber configured to be mounted to a vessel in a brew mode and a self-contained saucer mode. The example beverage brewing device also includes a substantially flat lid attaching to the perforated chamber. The substantially flat lid has a saucer groove to enable turning the device from the brew mode to the self-contained saucer mode as a single unit without need for a separate, removable saucer to catch drainage after the perforated chamber is removed from a beverage in the vessel.

4 Claims, 8 Drawing Sheets

(56) References Cited

U.S. PATENT DOCUMENTS

| | | | | |
|---|---|---|---|---|
| 2012/0107455 A1* | 5/2012 | Briggs | ............. | A47J 31/20 |
| | | | | 426/78 |
| 2012/0174795 A1* | 7/2012 | Uspenski | ............. | A47G 19/22 |
| | | | | 99/323 |
| 2013/0256307 A1 | 10/2013 | Hewitt | | |
| 2014/0242240 A1* | 8/2014 | Billadeau | ............. | A47J 31/20 |
| | | | | 426/435 |
| 2015/0053090 A1* | 2/2015 | Berger | ............. | A47J 31/0636 |
| | | | | 99/295 |

OTHER PUBLICATIONS

Bebo, Joel, "KLiP All-in-One Tea Brewer" available on YouTube at https://www.youtube.com/watch?v=9YAx-1SA3vE; inventor's public disclosure of invention on Mar. 9, 2013.

* cited by examiner

BEVERAGE BREWING DEVICE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is in the technical field of beverage brewing. More particularly, the present invention is in the technical field of tea beverage brewing.

Tea beverages are commonly brewed using single-use tea bags or by using multi-use infusing devices such as tea balls, baskets, or whisks. These conventional methods of tea brewing may require the removal of the infusing device containing the expended tea leaves from the beverage in order to consume the beverage. This requires the need to either discard the expended tea leaves, elevate the expended tea leaves out of the beverage, or set the infusing device containing the expended tea leaves aside to be discarded or cleaned at a later time. During these events, the person may need to be near a waste disposal receptacle, dishwashing sink, have access to a separate saucer plate, or other containment device in order to capture the absorbed fluid that will drain out of the expended tea leaves once the expended tea leaves are out of the beverage.

If a person is using a conventional single-use disposable tea bag for the brewing process, the consumer of the tea beverage may choose to simply leave the tea bag and tea leaves in the drinking vessel during consumption of the beverage. On the contrary, typical multi-use tea infusing devices may be too large or stick out of the drinking vessel in such a way to obstruct a person from easily sipping while the device is in use.

SUMMARY OF THE INVENTION

The present invention is a multi-use tea infusing device with a saucer, a strainer basket, and clip(s) or hook(s) for mounting the infusing device onto a drinking vessel. The combination of these features is in a self-contained unit that allows for a person to sip, with minimal obstruction, the tea beverage while the tea infusing device is brewing or mounted on the drinking vessel. Furthermore, this same tea infusing device with a built in saucer, when removed off the drinking vessel and out of the beverage, can be flipped, roughly 180 degrees, and set aside to capture the absorbed fluid that will drain out of the expended tea leaves, keeping the drainage from spilling over and onto the surrounding surface(s).

DETAILED DESCRIPTION OF THE INVENTION

Figure 1:
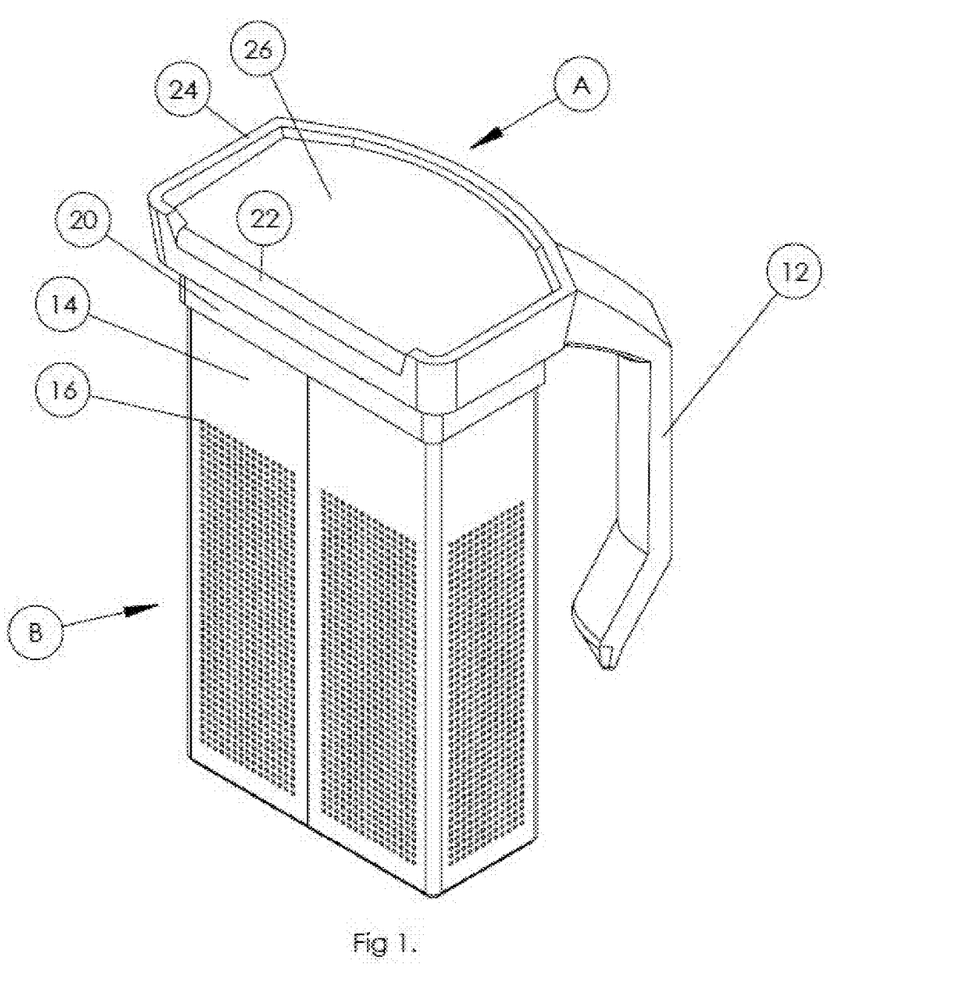
FIG. 1 is an upright perspective view of the present invention.
Figure 2:
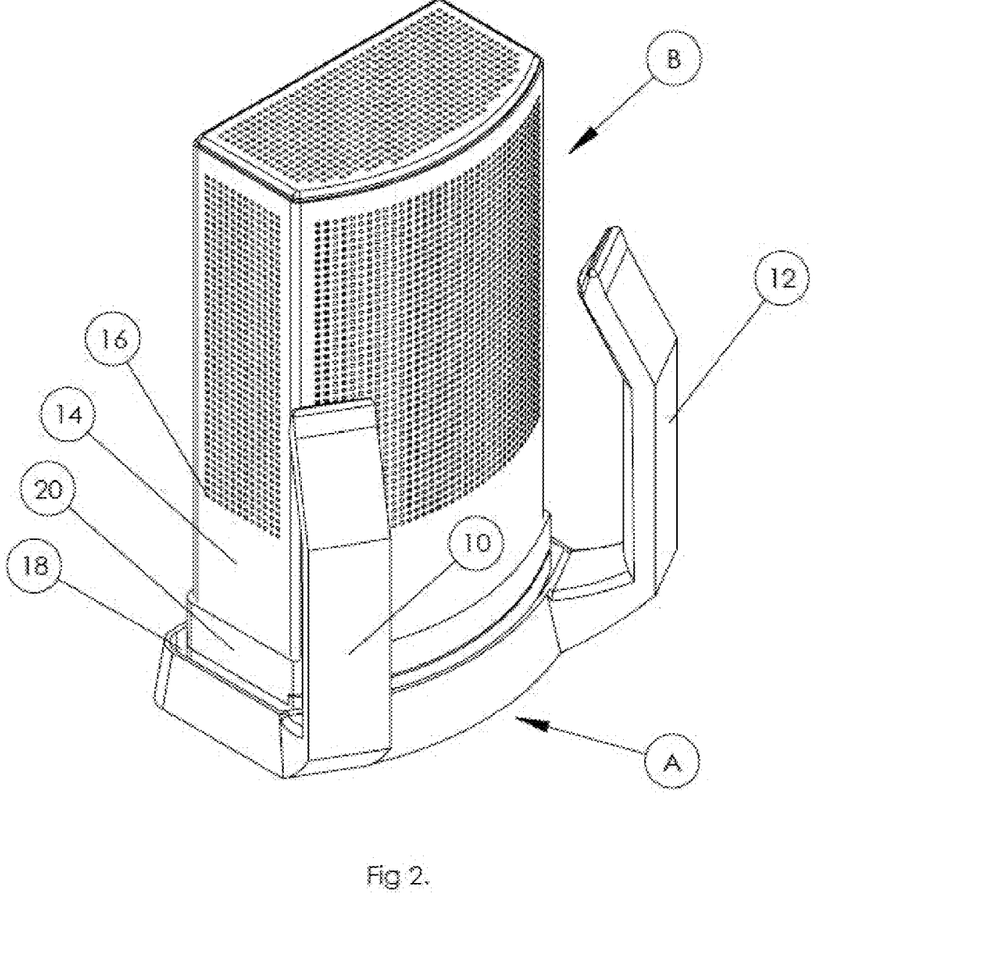
FIG. 2 is a flipped perspective view of the present invention.
Figure 3:
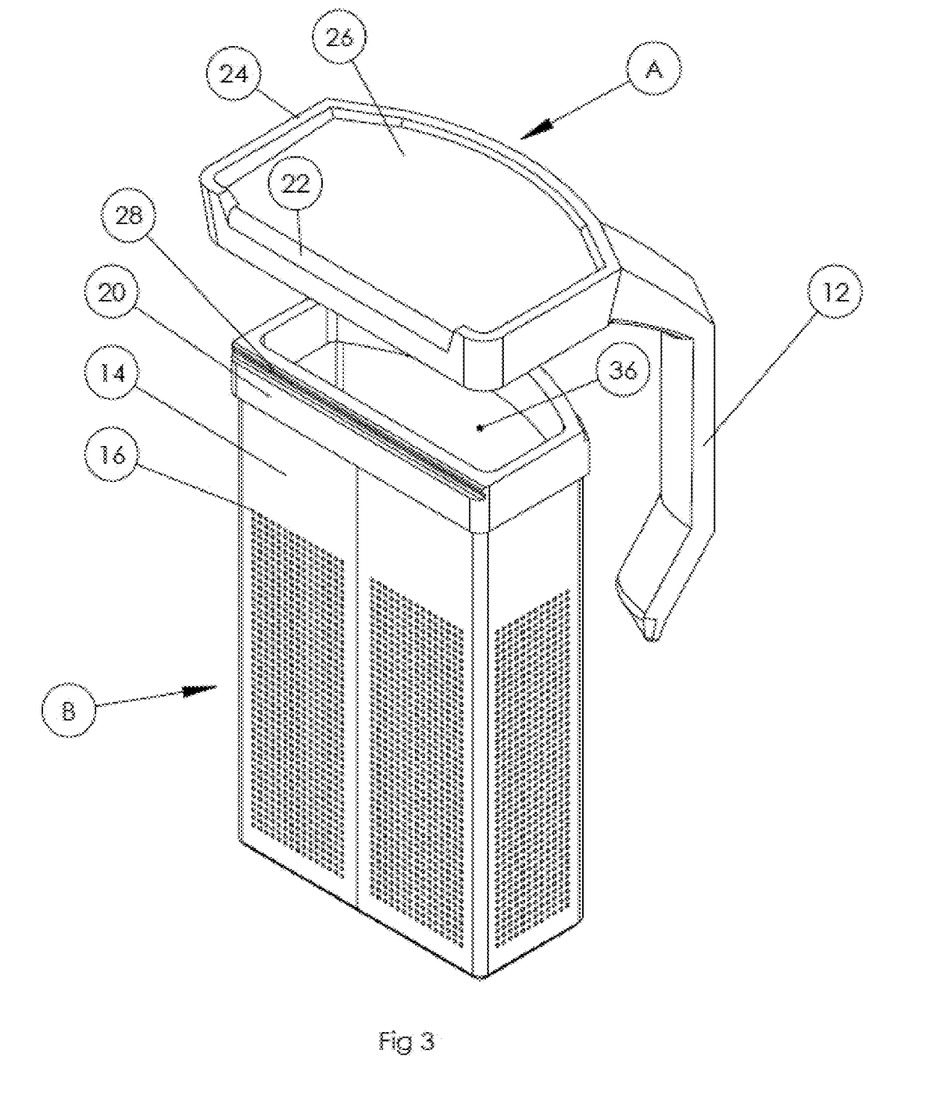
FIG. 3 is an exploded upright perspective view of the present invention.
Figure 4:
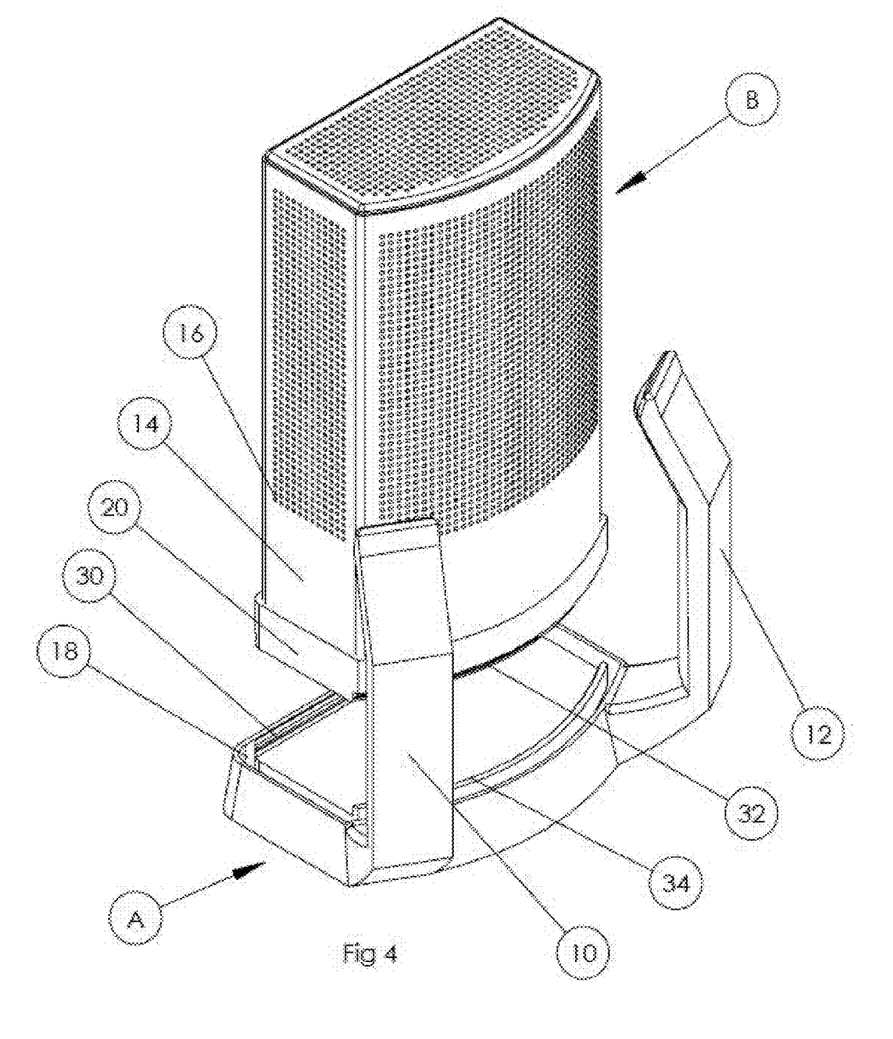
FIG. 4 is an exploded flipped perspective view of the present invention.
Figure 5:
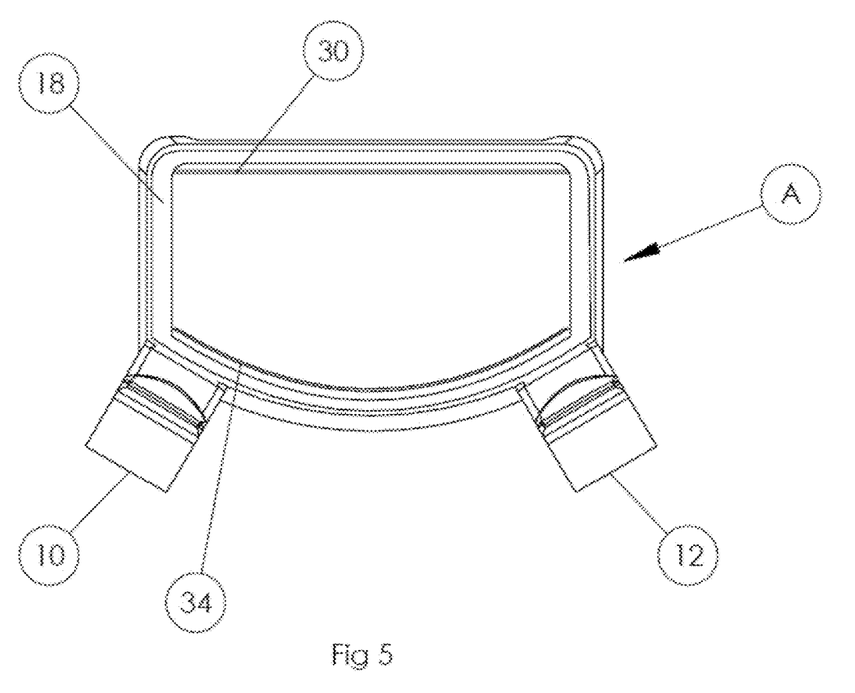
FIG. 5 is a bottom view of the of the saucer/clip housing of the present invention.
Figure 6:
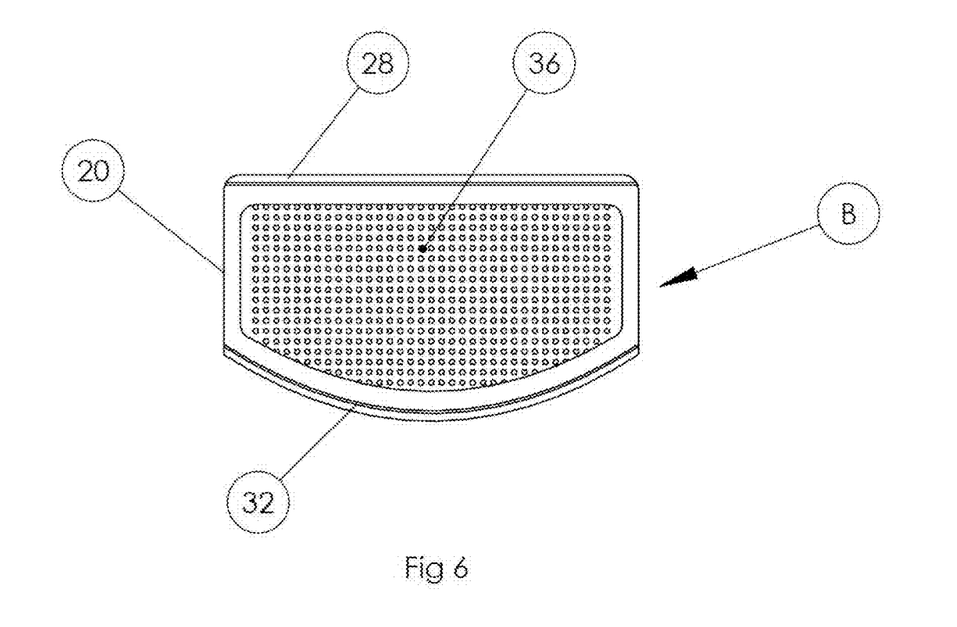
FIG. 6 is a top view of the of the strainer assembly of the present invention.

The details of the invention can be referenced in FIG. 1, FIG. 2, FIG. 3, FIG. 4, FIG. 5, FIG. 6, FIG. 7, and FIG. 8. FIG. 1 and FIG. 2 show the clip/saucer housing A and strainer assembly B snapped together as a single unit. The orientation of the invention shown in FIG. 1 will be commonly referenced as brew mode and the orientation of the invention shown in FIG. 2 will be commonly referenced as saucer mode. FIG. 3 and FIG. 4 show the clip/saucer housing A and strainer assembly B separated as intended for inserting tea leaves inside the strainer assembly B via strainer opening 36. The strainer opening 36 will also allow for disposing of the expended tea leaves, cleaning, etc. Hook 10 and hook 12 allow for the invention to be mounted onto a drinking vessel such as a mug, canteen, thermos, etc. Hook 10 and hook 12 also serve as handles for when the invention is flipped from brew mode to saucer mode or vice versa. It is not necessary to have quantity two hooks, it may even function with a single hook and it is possible to have three or more hooks as well.

Saucer groove 18 is an integral feature of the clip/saucer housing A which allow for the device to be flipped from brew mode to saucer mode as a single unit and without the need for a separate, removable saucer to catch the excess drainage from the expended tea leaves once removed from the beverage.

In further detail, straight snap hook 28, straight snap hook groove 30, curved snap hook 32, and curved snap hook groove 34 allowing the clip/saucer housing A and strainer assembly B to be snapped together is referred to in FIG. 3 and FIG. 4. Straight snap hook 28 and curved snap hook 32 are features of the strainer snap hook assembly 20. Strainer holes 16 ranging in size of 0.01 inch to 0.10 inch in diameter are chemical etched, cut or punched out on the strainer body 14. The strainer body 14 may range in overall length of 1.0 inch to 7.0 inch and have a typical wall thickness of 0.005 inch to 0.200 inch depending on the material of construction. The combination of features included in the strainer snap hook assembly 20 and the strainer body 14 make up the strainer assembly B. The strainer assembly B and features identified on the strainer snap hook assembly 20 and the strainer body 14 may be constructed from a single piece or multiple pieces.

The strainer snap hook assembly 20 may be constructed from plastic, rubber, metal, wood, or a variety of other rigid, semi-rigid materials. Strainer body 14 may be constructed from plastic, rubber, metal, wood, or a variety of other rigid, semi-rigid materials. The strainer snap hook assembly 20 and strainer body 14 may be constructed as one solid piece or multiple parts assembled together.

Figure 7:
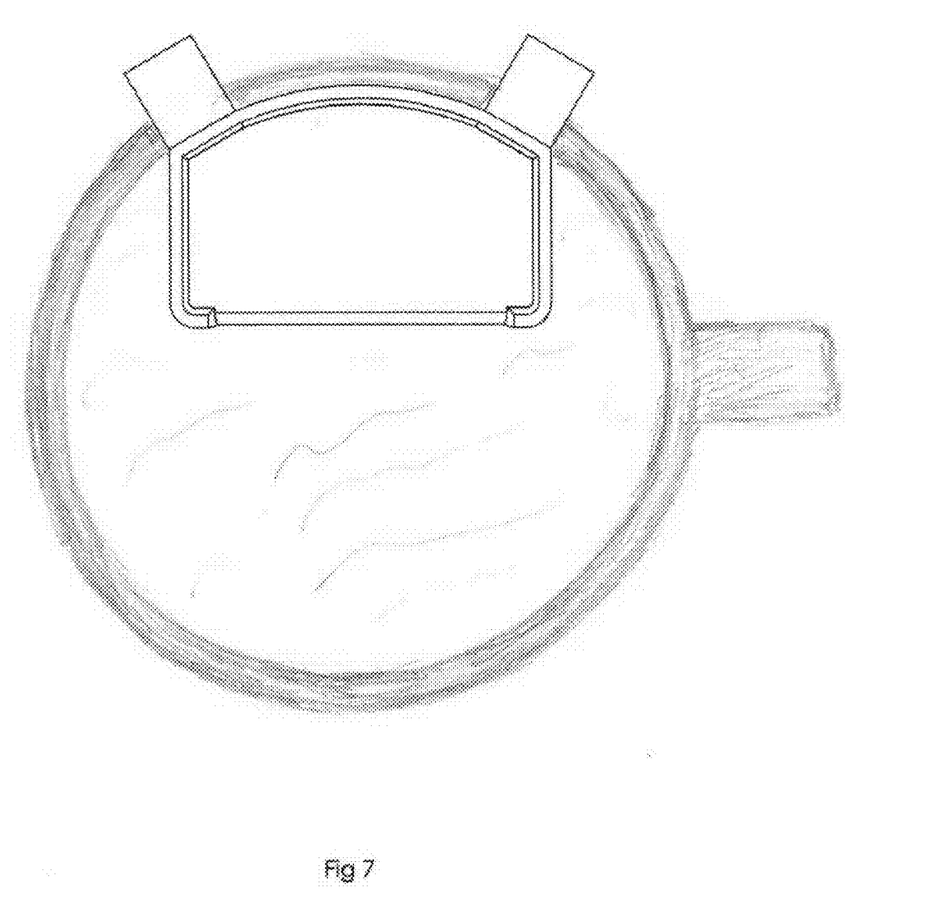
FIG. 7 is a top view of the invention mounted in brew mode in a drinking vessel
Figure 8:
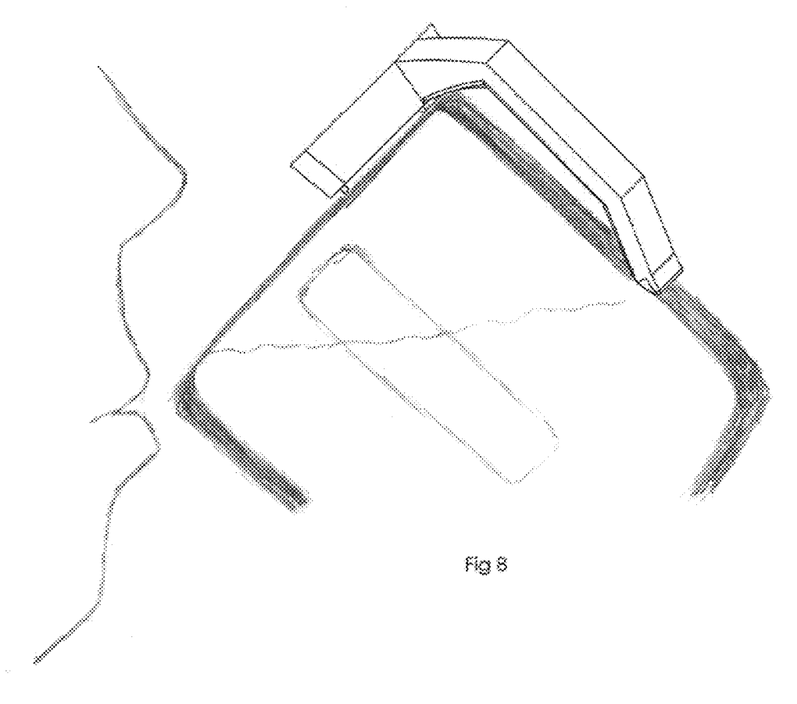
FIG. 8 is a side view showing the invention in use while a person sips the beverage

Clip/saucer housing A may be constructed as one solid piece or multiple parts assembled together with hook 10, hook 12, saucer groove 18, straight snap hook groove 30, curved snap hook groove 34, and saucer bottom 24 as features. Clip/saucer housing A may be constructed from plastic, rubber, metal, wood, or a variety of other rigid, semi-rigid materials. If desired, nose indent 26 and indent fillet 22 may be added to minimize interference with the user's nose while sipping the beverage from a drinking vessel with the invention mounted in brew mode, reference FIG. 7 and FIG. 8 showing conceptual usage. In FIG. 7 and FIG. 8, note the generous opening/sipping area available on the drinking vessel even with the invention mounted on a drinking vessel, which is a key feature in combination with the other features mentioned elsewhere on this document that allows a person to sip the beverage with the invention in use with minimal obstruction. Hook 10 and hook 12 can either be rigid or semi-flexible to allow for radial flexing when mounted on drinking or brewing vessels of different wall thickness.

The advantages of the present invention include, without limitation, allowing a person to sip out of a drinking vessel while the invention is mounted and used in brew mode. The invention also allows a person to use the device as a self-contained saucer without needing a separate saucer plate, or other containers such as a waste disposal receptacle or dishwashing sink in order to capture the absorbed fluid that will drain out of the expended tea leaves once the device and expended tea leaves are out of the beverage.

In broad embodiment, the present invention is a tea infuser.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A beverage brewing device, comprising:
   a perforated chamber having substantially flat walls on three sides and having a curved wall on a fourth side, wherein the curved wall substantially follows a curvature of a vessel;
   a substantially flat lid attaching to the perforated chamber;
   wherein the chamber is configured to be positioned in the vessel to infuse a liquid beverage in the vessel, and the chamber is further configured to be removed from the vessel, turned upside down, and placed on the substantially flat lid to collect drippings without need for a saucer or other collection plate; and
   a first clip to mount the perforated chamber onto an inside of the vessel; and
   at least a second clip to mount the perforated chamber onto the inside of the vessel, wherein both the first clip and the second clip are on the substantially flat lid and form a handle.

2. The beverage brewing device of claim 1, wherein the perforated chamber is sized to take up less than about half of a horizontal diameter of the vessel when mounted onto the inside of the vessel.

3. A beverage brewing device, comprising:
   a perforated chamber configured to be mounted to a vessel in a brew mode, and the perforated chamber removed from the vessel in a self-contained saucer mode, the perforated chamber being substantially rectangular with at least 3 flat sides and having a curved wall to mate with an arc of the vessel;
   a substantially flat lid attaching to the perforated chamber, the substantially flat lid having a saucer groove to enable turning the device about 180 degrees from the brew mode to the self-contained saucer mode as a single unit without need for a separate, removable saucer to catch drainage after the perforated chamber is removed from a beverage in the vessel;
   a first clip to mount the perforated chamber onto the inside of the vessel; and
   at least a second clip to mount the perforated chamber onto the inside of the vessel, wherein both the first clip and the second clip are on the substantially flat lid and form a handle.

4. The beverage brewing device of claim 3, wherein the perforated chamber is sized to take up less than about half of a horizontal diameter of the vessel when mounted onto the inside of the vessel.

* * * * *